Nov. 9, 1926.
H. H. MAPELSDEN
1,605,964
ANTIGLARE DEVICE FOR AUTOMOBILE WINDSHIELDS
Filed August 3, 1922
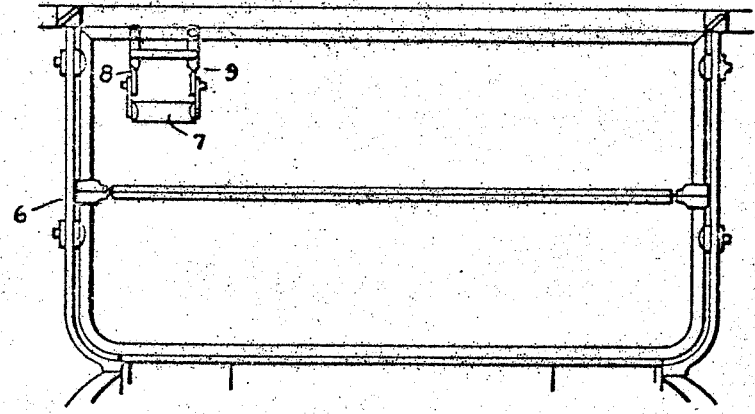
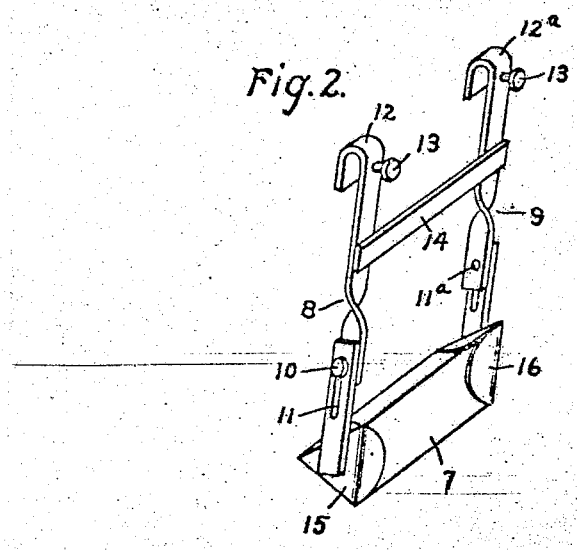 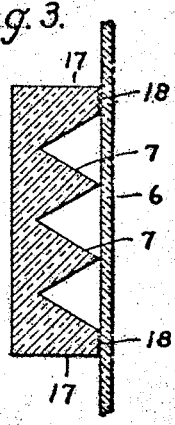 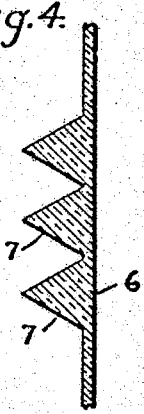
Inventor
Harold H. Mapelsden
by Alfred ... 
Atty.

Patented Nov. 9, 1926.

1,605,964

UNITED STATES PATENT OFFICE.

HAROLD H. MAPELSDEN, OF SCHENECTADY, NEW YORK.

ANTIGLARE DEVICE FOR AUTOMOBILE WINDSHIELDS.

Application filed August 3, 1922. Serial No. 579,491.

In driving automobiles, the eyes of the driver are often dazzled by the glare of the sun or by the glare of the headlights of an approaching automobile and various devices have been proposed and used to overcome this trouble, some of the more common being to provide a piece of colored glass to be placed on the windshield in front of the driver's eyes or to provide means to render a section of the windshield glass opaque as by painting a black section on it or suspending an opaque member in front of the glass and in line with the vision of the driver. This latter arrangement is preferable from the standpoint of efficiency for it absolutely prevents any glaring light from reaching the eyes of the driver. However, it has the substantial disadvantage that it tires the eyes and also is annoying to many drivers to have a dark object before their eyes continuously.

The object of my invention is to provide an improved form of anti-glare device for windshields which, while it prevents the passage of any light directly through it is at the same time the same color as the windshield glass so it avoids the objections set forth above.

According to the preferred form of my invention I provide an anti-glare device in the form of a glass prism arranged on the windshield glass at a height in line with the eyes of the driver so it catches light coming from the sun or from the headlights of an approaching automobile and reflects and refracts the same. The prism is preferably made of clear glass so it is the same color as the windshield glass and hence does not have the tiring and annoying effect of a dark object in front of the eyes. The prism may be formed separately and be suspended on the windshield by a suitable frame which is preferably adjustable, or it may be molded as a part of the windshield glass. Or, if desired, it may be formed separately and then cemented to the windshield glass. Also, instead of a single prism I may use two or more prisms arranged adjacent each other.

In the drawing, Fig. 1 is a view of a windshield provided with an anti-glare device embodying my invention; Fig. 2 is a perspective view of the device; Fig. 3 shows a modification wherein the prism is cemented to the windshield glass; and Fig. 4 is a modification showing an arrangement wherein the prism is formed as an integral part of the windshield glass.

Referring to the drawing, Figs. 1 and 2, 6 indicates a windshield of an automobile and 7 a glass prism supported on the windshield by a suitable adjustable frame. In the present instance the frame comprises two side members 8 and 9 each formed of two overlapping pieces held together by a set screw 10, which passes through a slot 11 in one piece and screws into a hole 11ª in the other piece. At the upper ends of members 8 and 9 are hooks 12 and 12ª which hook over the top of the windshield frame and are fixed in position by set screws 13. The side members are held in spaced relation to each other by a cross piece 14 and at their lower ends they carry sockets 15 and 16 in which the ends of prism 7 are located. The sockets and side members of the frame may be formed integral with each other or they may be formed separately and suitably fastened together. It will of course, be understood that the frame illustrated is but one form which may be used and that any other suitable form may be used if found desirable.

In use the frame is fastened to the windshield by hooks 12 and 12ª and set screws 13 and is adjusted by means of set screws 10 to bring the prism to the desired height to suit the individual driver. When driving, the driver watches the road, usually his side of the road, by looking through the windshield to one side of the prism. The prism, however, stands in front of his eyes and will prevent any light from an approaching automobile or from a low glaring sun from reaching them. The driver of course, can locate his head to render the prism fully effective. The prism will reflect and refract all light striking it so that none of the light rays will find their way directly to the driver's eye. As is well known all light rays striking a prism are either reflected or refracted, none passing directly through the prism.

In Fig. 3 is illustrated an arrangement wherein instead of the prism 7 being carried by a frame it is cemented to the windshield glass itself. In such a case, since the prism is not then adjustable, I preferably use two or more prisms arranged one above the other as shown so as to meet the requirements of different drivers. In the present instance, I have shown two prisms 7 formed integral with each other, and with end pieces 17 which provide flat surfaces 18 for cementing it to windshield glass. Preferably it will be placed on the inside of the glass.

In Fig. 4 I have shown a further modification wherein the prism 7 is formed integral with the windshield glass 6, a plurality of prisms being used in this case also for the reasons stated in connection with the description of Fig. 3.

In actual use I have found a 60° prism approximately six inches long and having faces about two inches wide to be satisfactory, but it will be understood that prisms of any dimensions found suitable may be used. The prism may be used with a flat side toward the driver or any other angle, for in any case it will reflect and refract the light striking it.

As pointed out above, one of the advantages of my device is that it does not tire the eyes for while the driver cannot see through it, still it is the same color as the windshield glass, and blends into it so it does not produce the effect of having a dark object continuously in front of the eyes.

It will be understood of course, that instead of having only a single prism carried by the adjustable frame, two or more prisms may be carried by it and they may be arranged in any suitable manner.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a windshield for vehicles, of an anti-glare device associated therewith comprising a clear glass prism located in the line of vision of the driver and adapted to transfer rays from the line of vision of the driver.

2. A windshield for vehicles provided on its inner face with a transversely-extending projection in the line of vision of the driver, said projection being prismatic in form to transfer the rays from the line of vision of the driver.

3. An anti-glare device for the windshield of an automobile, said device comprising a clear glass prism and an adjustable frame for attaching it to a windshield.

4. A windshield for vehicles provided on its face with a transversely-extending projection in the line of vision of the driver, the face of the projection towards the driver being non-planiform in contour whereby it serves to transfer the rays from the line of vision of the driver.

5. A windshield for vehicles provided on its face with a transversely-extending projection in the line of vision of the driver, the face of the projection towards the driver being non-planiform in contour whereby it serves to transfer the rays from the line of vision of the driver, and the ends of the projection terminating short of the vertical edges of the windshield.

In witness whereof, I have hereunto set my hand this 1st day of August, 1922.

HAROLD H. MAPELSDEN.